(12) United States Patent
Bailly et al.

(10) Patent No.: US 11,047,752 B2
(45) Date of Patent: Jun. 29, 2021

(54) PRESSURE-MEASURING DEVICE WITH IMPROVED RELIABILITY AND ASSOCIATED CALIBRATION METHOD

(71) Applicant: SAFRAN ELECTRONICS & DEFENSE, Boulogne Billancourt (FR)

(72) Inventors: Eric Bailly, Boulogne Billancourt (FR); Jean-Christophe Riou, Boulogne Billancourt (FR)

(73) Assignee: Safran Electronics & Defense, Boulogne Billancourt (FR)

( * ) Notice: Subject to any disclaimer, the term of this patent is extended or adjusted under 35 U.S.C. 154(b) by 66 days.

(21) Appl. No.: 16/673,181

(22) Filed: Nov. 4, 2019

(65) Prior Publication Data
US 2020/0064217 A1  Feb. 27, 2020

Related U.S. Application Data

(62) Division of application No. 15/578,676, filed as application No. PCT/EP2016/062731 on Jun. 3, 2016, now Pat. No. 10,634,569.

(30) Foreign Application Priority Data

Jun. 3, 2015  (FR) ...................... 15 55042

(51) Int. Cl.
*G01L 15/00* (2006.01)
*G01L 27/00* (2006.01)
*G01L 9/00* (2006.01)

(52) U.S. Cl.
CPC ............ *G01L 15/00* (2013.01); *G01L 9/0052* (2013.01); *G01L 9/0072* (2013.01); *G01L 27/002* (2013.01); *G01L 27/007* (2013.01)

(58) Field of Classification Search
CPC ..... G01L 19/147; G01L 9/0042; G01L 19/04; G01L 9/0054; G01L 9/0072;
(Continued)

(56) References Cited

U.S. PATENT DOCUMENTS 4,222,277 A    9/1980  Kurtz et al.
6,374,191 B1 *  4/2002  Tsuchiya ............... G01L 27/002
                                                        702/104

(Continued)

FOREIGN PATENT DOCUMENTS

DE   202014103355 U1   8/2014
EP       1970688 A2    9/2008
WO   WO-2007031516 A1  3/2007

*Primary Examiner* — Andre J Allen
(74) *Attorney, Agent, or Firm* — Muncy, Geissler, Olds & Lowe, P.C.

(57) ABSTRACT

A pressure measurement device comprising a pressure sensor of a first type and a pressure sensor of a second type different from the first, which sensors are mounted on a common support in order to be subjected to the same pressure, in which the pressure sensor of the first type is of the capacitive type, the device being characterized in that the pressure sensor of the first type comprises at least one membrane and a first internal channel passing through the common support, a second internal channel bringing a fluid to the membrane being in fluid flow connection with the first internal channel. A calibration method associated with the device.

3 Claims, 4 Drawing Sheets

(58) Field of Classification Search
CPC ... G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618; G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16; H01L 2224/48091; H01L 2924/00014; H01L 2224/48137; H01L 2224/48145; H01L 2224/73265; H01L 2924/00012; H01L 2224/04105; H01L 2224/24137; H01L 2224/49175; H01L 24/19; H01L 2924/1461; H01L 2924/1815; H01L 2924/18162; H01L 29/84; H01L 41/047; H01L 41/0475; H01L 41/1132

USPC .................................................. 73/700–756

See application file for complete search history.

(56) References Cited

U.S. PATENT DOCUMENTS

| | | |
|---|---|---|
| 6,518,084 B1 | 2/2003 | Seitz et al. |
| 7,043,960 B1 | 5/2006 | Lueck |
| 2003/0176850 A1 | 9/2003 | Melvas |
| 2006/0081057 A1 | 4/2006 | Silverbrook et al. |
| 2009/0165572 A1 | 7/2009 | Harish |
| 2013/0118265 A1* | 5/2013 | Besling .................. G01L 9/125 73/724 |
| 2013/0279717 A1* | 10/2013 | Reimann ................. H04R 3/02 381/93 |
| 2014/0291677 A1 | 10/2014 | Le Neel et al. |
| 2015/0127287 A1* | 5/2015 | Wolf ..................... G01L 27/002 702/98 |
| 2015/0226628 A1* | 8/2015 | Stering ................. G01L 27/005 73/1.63 |
| 2016/0018281 A1 | 1/2016 | Hammerschmidt |
| 2017/0209056 A1 | 7/2017 | Browd et al. |
| 2019/0017893 A1 | 1/2019 | Tumpold |
| 2019/0383684 A1* | 12/2019 | Kollias .................... G01L 9/02 |
| 2020/0292403 A1* | 9/2020 | Matsuda ................. G01F 3/221 |

* cited by examiner

PRESSURE-MEASURING DEVICE WITH IMPROVED RELIABILITY AND ASSOCIATED CALIBRATION METHOD

CROSS REFERENCE TO RELATED APPLICATIONS

This application is a Divisional of co-pending application Ser. No. 15/578,676, filed on 30 Nov. 2019, for which priority is claimed under 35 U.S.C. § 120, the entire contents of all of which are hereby incorporated by reference.

FIELD OF THE INVENTION

The present invention relates to the field of measuring pressure, and more particularly to electromechanical sensors of fluid pressure for aviation applications, and specifically sensors of the microelectromechanical systems (MEMS) type.

BACKGROUND OF THE INVENTION

An electromechanical pressure sensor generally comprises a membrane made of silicon or of a silicon alloy having piezoelectric strain gauges fitted on its front face that are arranged as a Wheatstone bridge and connected to an electronic processor unit by connection wires. The rear face opposite from the face carrying the strain gauges is subjected to a pressure that is to be measured, which pressure, by deforming the membrane, strains the gauges and enables the pressure to be measured electrically. The membrane is generally mounted on a support that is also made of silicon. Since silicon is particularly sensitive to electrochemical attack, the membrane is mounted at one end of a duct filled with a transfer fluid, generally silicone oil. The other end of the duct is closed by a pellet of stainless steel having its outside face in contact with the fluid of pressure that is to be measured. The pressure applied to the stainless steel pellet is transmitted via the transfer fluid to the silicon membrane and is measured by the processor unit on the basis of signals supplied by the strain gauges. The electrical signal generated by the processor unit is then transmitted to a communication network.

The sensor as obtained in this way is generally bulky, heavy, and expensive, in particular because of the presence of the duct filled with oil and of the associated sealing elements. Specifically, the oil must be absolutely incompressible, and such oils are expensive and freeze at low temperature to such an extent as to transmit vibration. If they are not totally free of impurities and/or free radicals, such oils generate electrical drift when they are subjected to an electric voltage. The cylindrical duct must be filled in extremely rigorous manner since the presence of any air in the duct would make the sensor inaccurate, or even inoperative. Performing this operation and inspecting it increase the cost of producing the sensor. The membrane of the sensor is generally fitted on the support of the sensor by adhesive or by brazing. This junction must be leaktight so as to avoid any intrusion of fluid under the membrane, which would end up ruining the sensor. Such operation suffers from the variability that is associated with being performed manually, and it is a recurrent source of defects. Finally, such a sensor is extremely sensitive to rapid variations in the temperature of the fluid of pressure that is to be measured. Specifically, although piezoelectric sensors are well known for presenting low sensitivity to temperature variations, the behaviors of the transfer fluid and of the duct lead to errors that are difficult to compensate. Finally, at extremely low temperatures, the transfer fluid can freeze and make the sensor inoperative.

Resistive sensors require regular calibration in order to conserve an acceptable level of accuracy, in particular because of their sensitivity to temperature. Calibrating a piezoelectric sensor generally requires a calibrated measurement device to be connected to its terminals, so it must be possible to access the sensor physically. Such an operation requires the equipment in which the sensor is mounted to be taken out of operation, which leads to down-time that is harmful, particularly for sensors on board aircraft. Finally, an operating defect of a piezoelectric sensor can be difficult to distinguish from a defect in the transmission circuit. It is then necessary to provide local systems for monitoring operation.

OBJECT OF THE INVENTION

The object of the invention is to reduce the cost and the temperature sensitivity of an electromechanical pressure measurement device, while improving its reliability and accuracy.

SUMMARY OF THE INVENTION

To this end, the invention provides a pressure measurement device comprising a pressure sensor of a first type and a pressure sensor of a second type different from the first, which sensors are mounted on a common support in order to be subjected to the same pressure, in which the pressure sensor of the first type is of the capacitive type, the device being characterized in that the pressure sensor of the first type comprises at least one membrane and a first internal channel passing through the common support, a second internal channel bringing a fluid to the membrane being in fluid flow connection with the first internal channel.

It is then possible to make use of the properties that are specific to each sensor, in particular when they have sensitivities that are reduced under certain environmental conditions, such as temperature, humidity, speed, centrifugal force, or other types of stress. This particular configuration makes it possible to propose a device in which only the face opposite from the sensor of the first type needs to be subjected to the fluid of pressure that is to be measured. The second internal channel acts as a constriction and protects the capacitive sensor from pressure transients. This is particularly advantageous when using the sensor for monitoring the pressure of aircraft tires. Specifically, pressure peaks can occur during stages of landing, of taxiing, or in the event of impacts, which events are particularly harmful for prior art sensors when the events take place while the sensors are cold. The second internal channel also performs filtering of the fluid and prevents dust or particles carried by the fluid from reaching the membrane and disturbing measurements of capacitance by locally modifying the dielectric medium. Advantageously, the pressure sensor of the first type and the pressure sensor of the second type have different failure modes.

Since the failure modes are different, a significant measurement difference between the sensors reveals a failure in one of the sensors. A measurement difference should be considered as being significant when it exceeds the measurement error to be expected of each sensor.

In a particular embodiment, the pressure sensor of the first type and the pressure sensor of the second type have different accuracy ranges. Thus, it is possible to make use of specific accuracy ranges for various types of sensor. Advantageously, when one of the sensors is of the capacitive type and the second sensor is of the resistive type, the measurements taken by the capacitive sensor are influenced little by the temperature of the fluid having its pressure measured. The resistive sensor is capable of taking measurements that are independent of any inertial forces to which it is subjected, which is particularly advantageous for wheel pressure sensors.

The measurement device may be made very compact by mounting a processor unit on the common support and by connecting it to the pressure sensors of the first type and of the second type. This embodiment also makes it possible to establish junctions between the sensors and the processor unit in automatic manner in a factory instead of establishing them manually while assembling the device, thus making it possible to reduce sensitive assembly operations and contributing to reducing the cost of installing the device.

Advantageously, the pressure sensor of the first type and the pressure sensor of the second type are mounted on respective opposite faces of the common support. This configuration makes it possible to use modes of protection (covering, shielding) adapted to the specific features of the sensors by treating each of the surfaces in full.

The processor unit can then be mounted on the first face of the common support close to one of the sensors and can receive the same protection treatment as that sensor.

Advantageously, one of the faces of the common support includes at least a portion that is covered in parylene or in a covering of carbon of the diamond like carbon (DLC) type. These coverings serve to provide effective protection for sensors when measuring the pressure of fluids that are corrosive or when measuring pressure in an aggressive medium.

In a particular embodiment, one of the pressure sensors is enclosed under a hermetic cover secured to the common support. This makes it possible to define and isolate the portion of the support surface carrying the sensor that is to be subjected to the pressure of the fluid of pressure that is to be measured.

One or both of the pressure sensors may be connected to wireless communication means, thus making it possible to interrogate it remotely without needing to perform any disassembly, and thus making it possible to reduce downtimes. The small electricity consumption of capacitive type sensors is particularly suitable for such a mode of communication.

The invention also provides a method of calibrating such a pressure measurement device having at least one pressure sensor of a first type and at least one pressure sensor of the second type mounted on a single support, the method comprising a step of comparing the measurement taken by one of the sensors with a measurement of the same pressure taken by the other sensor. It is thus possible to perform calibration of each of the sensors in real time by retaining the measurement of one or the other of the sensors depending on which sensor is in a situation in which it is known that the measurement from that sensor is more reliable than the measurement from the other.

The method may also include an additional step of issuing an integrity alert in the event of a comparison between the measurements taken by each of the sensors making it likely that one of them is defective.

BRIEF DESCRIPTION OF THE DRAWINGS

Reference is made to the accompanying drawings, in which.

DETAILED DESCRIPTION OF THE INVENTION

Figure 1:
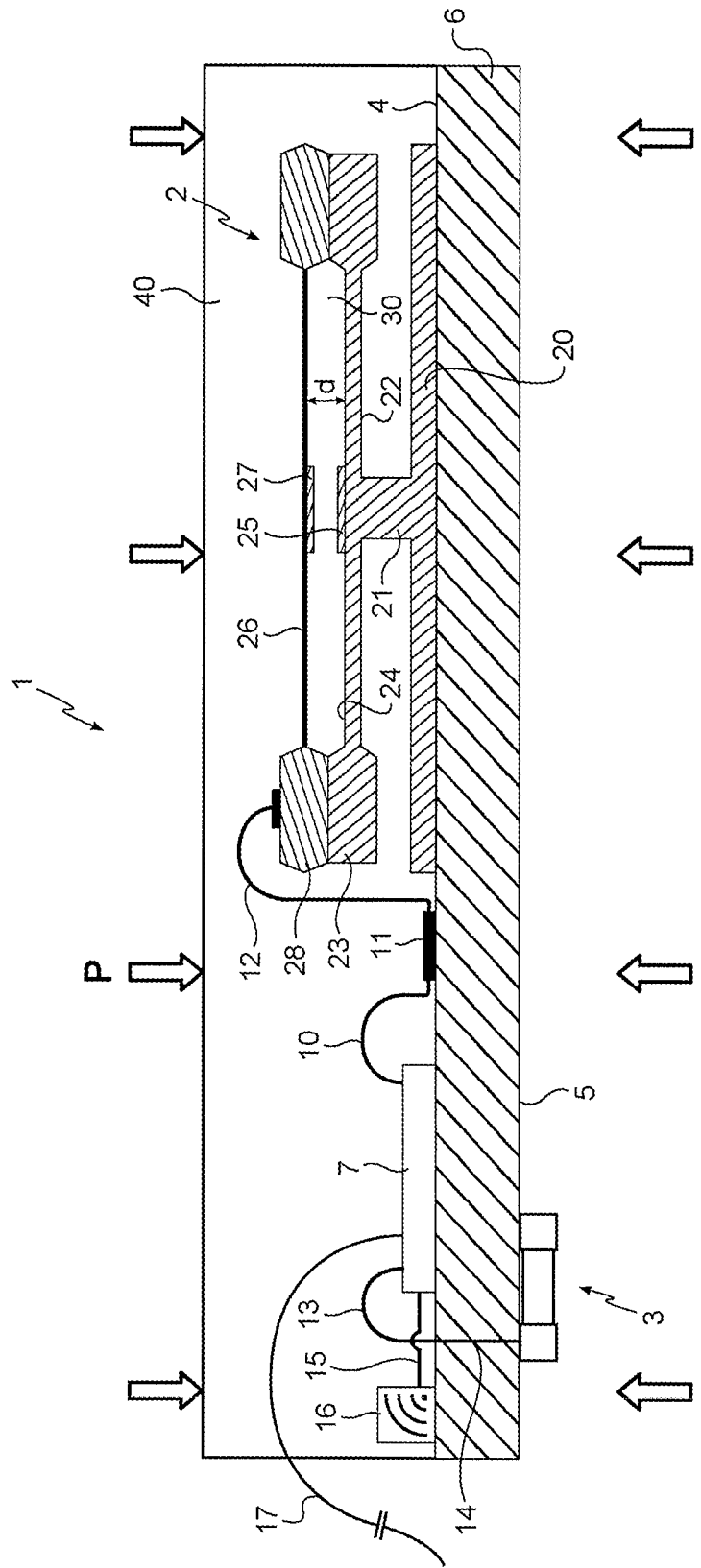
FIG. 1 is a diagrammatic section view of a first embodiment of a pressure measurement device of the invention.

With reference to FIG. 1, the pressure measurement device of the invention, given overall reference 1, comprises a pressure sensor 2 of capacitive type and a pressure sensor 3 of piezoelectric type, which sensors are mounted respectively on opposite first and second faces 4 and 5 of a common support 6. In this example, the support 6 is made of silicon and receives on its first face 4 a processor unit 7 connected by a first conductor wire 10 to one end of a conductor track 11 printed on the surface 4. The first conductor wire 10 has an opposite second end that is connected to a second conductor wire 12 connected to the sensor 2. A third conductor wire 13 connects the processor unit 7 to an internal conductor track 14 that passes through the support 6 from the first face 4 to the second face 5 and that connects the sensor 3 to the processor unit 7.

In this example, the processor unit 7 is an application specific integrated circuit (ASIC) and it is arranged to deliver an electrical signal that is a function of the impedance values (resistance of the sensor 3, capacitance of the capacitor 2) that are measured at the terminals of the sensors 2 and 3. The processor unit 7 is also arranged to perform logic operations on the measured impedances. The processor unit 7 is also connected by a fourth conductor wire 15 to a Bluetooth module 16 and by a fifth conductor wire 17 to an external wired transmission circuit (not shown).

The first face 4 of the support 6 receives a covering 40 of parylene that then covers the sensor 2, the conductor wires 10, 12, 13, and 15, and also the processor unit 7 and the Bluetooth module 16. Coverings of carbon of the diamond like carbon (DLC) type are also appropriate for protecting the first face 4 of the support 6, the sensor 2, the conductor wires 10, 12, 13, and 15, and also the processor unit 7 and the Bluetooth module 16.

The sensor 2 is in the form of a right cylinder having a base 20 secured to the support 6. A central leg 21 projects from the base 20 to join the first face 22 of a silicon substrate 23. On its second face 24 opposite from the first face 22, the substrate 23 has a first plate 25 and a deformable membrane 26 that extend facing the second face 24 of the substrate 23 at a distance d therefrom. The deformable membrane 26 is made of silicon and includes a plate 27 that extends facing the plate 25.

The deformable membrane 26 includes a peripheral swelling 28 of annular shape presenting a plane junction portion in its bottom face in contact with the second face 24 of the substrate 23. The deformable membrane 26, its swelling 28, and the second face 24 of the substrate 23 define a sealed enclosure 30 that surrounds the first plate 25. The sealed enclosure 30 is at an absolute pressure of substantially zero.

In operation, the pressure measurement device 1 is placed in the fluid of pressure P that is to be measured. The pressure P then acts on the capacitive sensor 2 and on the piezoelectric sensor 3 through the covering 40. Under the effect of the pressure P, the membrane 26 deforms and the distance d between the first plate 25 and the second plate 27 varies. The (essentially capacitive) impedance Z2 of the capacitor formed by the pair of plates 25 and 27 is then modified and transmitted to the processor unit 7 by the conductor wires 10 and 12 and the conductor track 11. The internal conductor track 14 enables the processor unit 7 to measure the (essentially resistive) impedance Z3 of the piezoelectric sensor 3. The processor unit 7 then converts these values into one or more electrical signals that it can transmit to a wired transmission circuit via the conductor wire 17, or by wireless communication using the Bluetooth module 16.

The leg 21 leaves the sensor 22 free to expand thermally, thereby attenuating thermomechanical stresses and serving to reduce the temperature sensitivity of the device 1.

Figure 2:
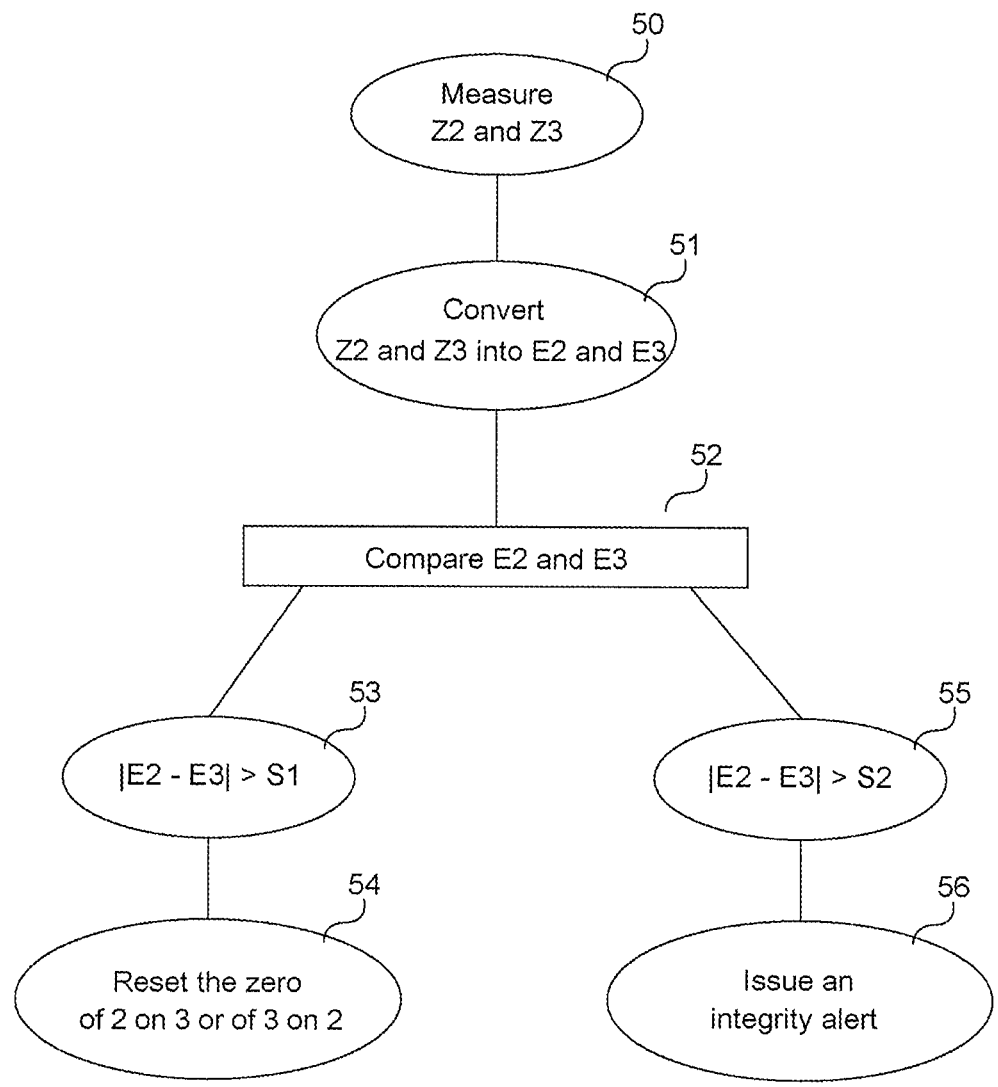
FIG. 2 is a flow chart showing the various steps of the calibration method of the invention.

With reference to FIG. 2, after measuring the respective impedances Z2 and Z3 of the sensors 2 and 3 in a step 50, the processor unit 7 converts them into respective electrical signals E2 and E3 representative of the measured pressure (step 51). In flight, when it is the piezoelectric sensor 3 that is assumed to be the more reliable, the processor unit 7 compares the signal E2 with the signal E3 (step 52). If the difference between the values E2 and E3 is greater than a first threshold S1 (step 53), then the value of the signal E2 from the piezoelectric sensor 3 is used for resetting the zero of the capacitive sensor 2 (step 54). If the difference between the values E2 and E3 is greater than a second threshold S2 (step 55), the processor unit 7 issues an integrity alert 57 (step 56). This integrity alert 57 may be issued in the form of a Bluetooth signal via the Bluetooth module 16 or it may be transmitted to the wired transmission circuit by the conductor wire 17.

Naturally, the method may also be performed in other situations (very high temperatures, very low temperatures, aircraft on the ground, taxiing, etc. . . . ), in which situations one or the other of the sensors 2 and 3 is used as the reference for calibration or for detecting a failure.

In the following description of second and third embodiments of the invention, elements that are identical or analogous to those described above are given identical numerical references.

Figure 3:
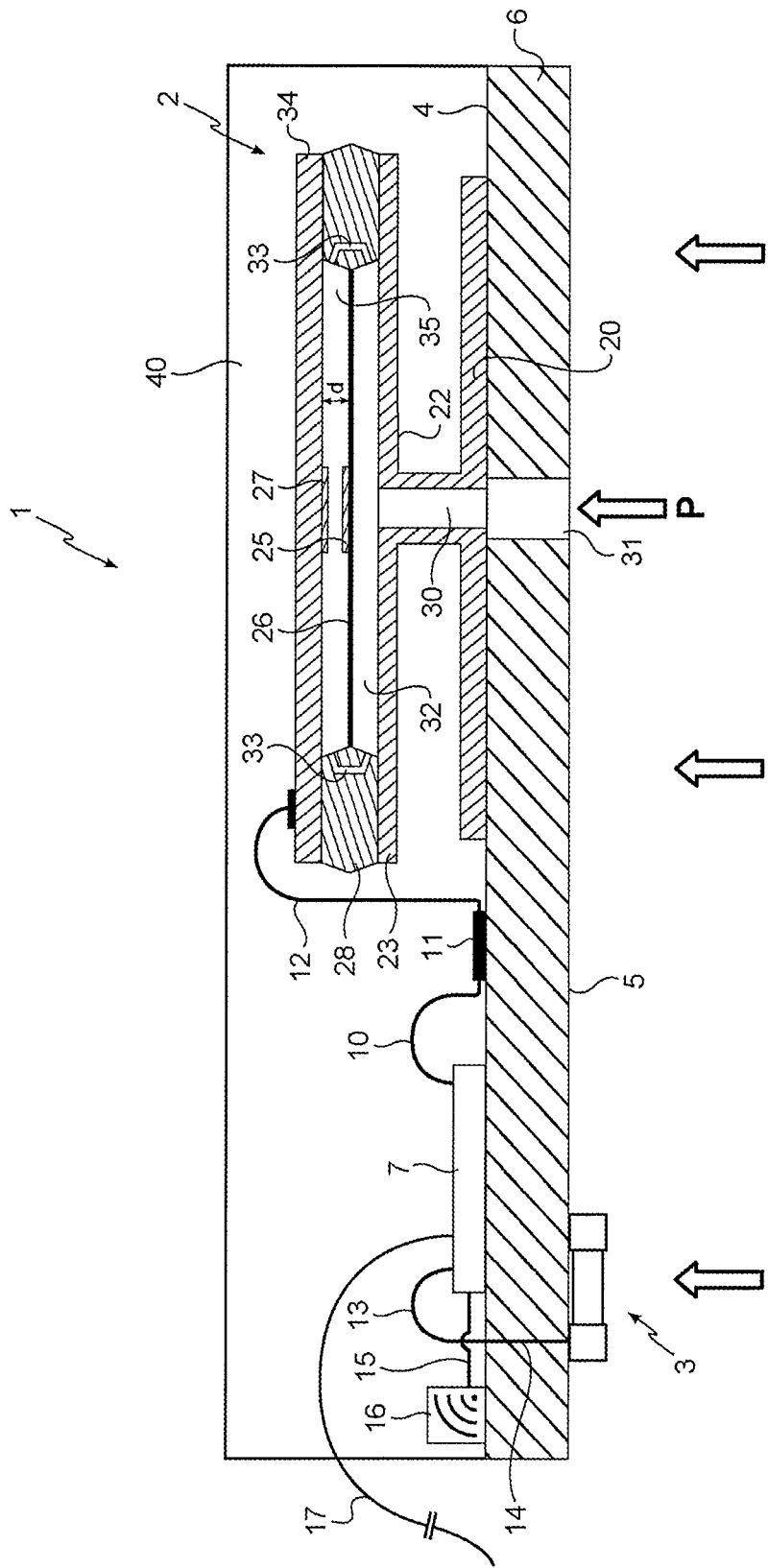
FIG. 3 is a view identical to the view of FIG. 1 showing a second embodiment of a pressure measurement device of the invention.

With reference to FIG. 3, in this example the sensor 2 includes a first internal channel 30 that extends in the leg 21 from an orifice 31 in the second face 5 of the support 6 and that passes through the base 20 and the support 6 in order to feed two second channels 33 that extend through the substrate 23 and the swelling 28. The two second channels 33 are preferably of a diameter lying in the range 10 micrometers (µm) to 50 µm. Very preferentially, the diameter of the second channels 33 lies in the range 10 µm to 20 µm. Finally, in preferred manner, the second channels 33 have a diameter substantially equal to 10 µm. Preferably, the ratio between the diameter of the first internal channel 30 and the diameter of the second channel 33 lies in the range 30 to 50. Very preferentially, the ratio between the diameter of the first internal channel 30 and the diameter of the second channel 33 is substantially equal to 50.

Figure 4:
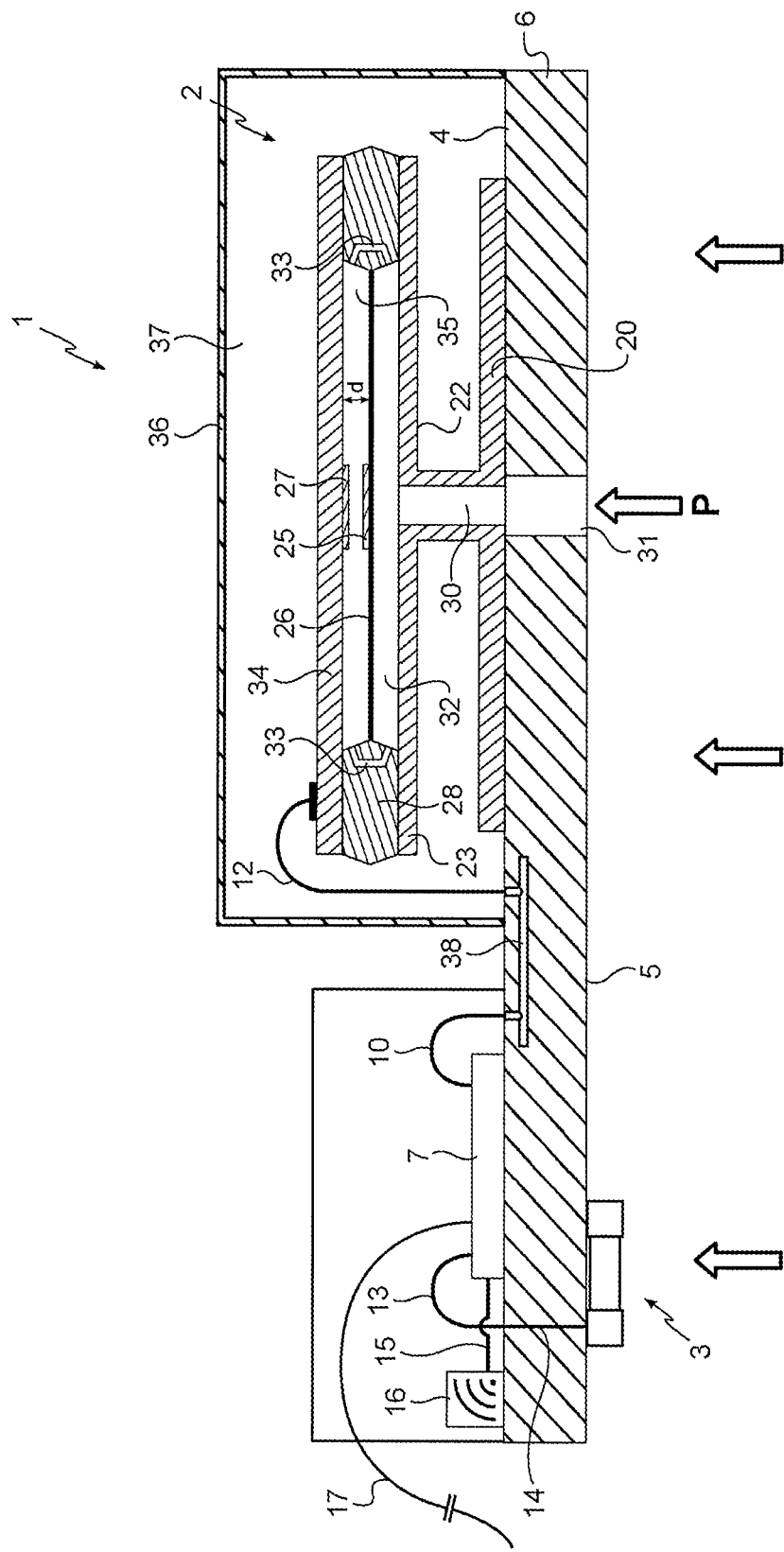
FIG. 4 is a view identical to the view of FIG. 1, showing a third embodiment of a pressure measurement device of the invention.

A lid 34 comes into contact with a top plane junction portion of the membrane 26 and extends facing it. The lid 34 then co-operates with the swelling 28 and the membrane 26 to define a sealed enclosure 35 into which the channels 33 lead. The first face 4 of the support 6 receives a parylene covering that then also covers the sensor 2, the conductor wires 10, 12, 13, and 15, together with the processor unit 7 and the Bluetooth module 16. Alternatively, and as shown in FIG. 4, the sensor 2 may be surrounded by a metal cover 36 secured to the first face 4 of the support 6 so as to define a sealed enclosure 37 around the sensor 2. The enclosure 37 may be at an absolute pressure of substantially zero or it may be filled with an inert gas such as nitrogen. The portion of the face 4 of the support 6 that includes the processor unit 7 is covered in parylene. Under such circumstances, the conductor track 11 is replaced by an internal conductor track 38 extending through the support 6.

This configuration of the measurement device 1 in which the sensor 2 is fed with fluid under pressure via the orifice 31 makes it possible to subject only one of the two faces of the support 6 to the pressure of the fluid to be measured (in this example the face 5) while taking measurements that make use of the sensors 2 and 3 that are situated on its two faces 4 and 5.

In the meaning of the present application, the term "plate" designates any electrically conductive element. It thus covers an element fitted onto a substrate or a membrane or indeed a portion of the substrate or the membrane (possibly all of it) that has electrical properties that enable it to define a capacitor plate. A ceramic membrane that is at least partially conductive thus constitutes a plate in the meaning of the present application.

Naturally, the invention is not limited to the embodiments described but covers any variant coming within the ambit of the invention as defined by the claims.

In particular:
  although herein the substrate of the sensor is made of silicon, the invention applies equally well to other types of substrate, such as for example a substrate made of silicon alloy, of multilayer high temperature co-fired ceramic (HTCC), or of multilayer low temperature co-fired ceramic (LTCC);
  although herein the deformable membrane is made of silicon, the invention applies equally to other types of membrane, such as for example a ceramic membrane;
  although herein the periphery of the deformable membrane is defined by an annular swelling, the invention applies equally to a periphery formed in some other way, such as for example a wall of rectangular section or peripheral spacers adhesively bonded to the substrate and/or to the membrane;
  although herein the sensor has two channels bringing fluid under pressure from the first channel passing through the support up to the deformable membrane, the invention applies equally to a single channel for delivering fluid under pressure up to the deformable membrane, or more than two channels;
  although herein the processor unit is an ASIC situated on the first face of the support, the invention applies equally to other processor means, such as for example a microcontroller, which may be situated on any of the faces of the support;
  although herein the electrical connections between the processor unit and the capacitive sensor and the Bluetooth module comprise internal conductor tracks printed on the support and conductor wires, the invention applies equally to other connection means, which may for example comprise internal conductor tracks extending in the deformable membrane;
  although herein a central fastening leg serves to attenuate thermomechanical stresses on the sensor, the invention applies equally to other types of device for attenuating thermomechanical stresses, such as for example resilient supports;
  although herein the processor unit is connected to a Bluetooth module, the invention applies equally to other wireless communication means such as for example WiFi communication means, radio wave means, or infrared means;

although herein the processor unit 7 issues an integrity alert when the difference between the pressure values measured by each of the sensors is greater than a predetermined threshold, the method of the invention applies equally to other types of event that could generate an integrity alert, such as for example variation in the value measured by one of the sensors that is not picked up by the other sensor, or a difference in reaction times between the sensors that is greater than a predetermined value; and although herein the pressure sensor of the first type is a capacitive type sensor and the pressure sensor of the second type is a piezoelectric type sensor, the invention applies equally to other types of sensor and combinations thereof, such as for example sensors of the piezoresistive or resonant type.

The invention claimed is:

1. A method of calibrating a pressure measurement device having at least one pressure sensor of a first type and at least one pressure sensor of a second type mounted on a single support, the method comprising a step of comparing the measurement taken by one of the sensors with a measurement of the same pressure taken by the other sensor.

2. The method according to claim 1, wherein the value of the pressure measured by one of the sensors is used to reset the zero of the other sensor.

3. The method according to claim 1, including an additional step of issuing an integrity alert.

* * * * *